April 4, 1939.  K. HOFFMANN  2,153,328

MOTION PICTURE PROJECTOR

Filed Jan. 10, 1938  2 Sheets—Sheet 1

Inventor
Kurt Hoffmann
by B. Singer
Atty

April 4, 1939.  K. HOFFMANN  2,153,328
MOTION PICTURE PROJECTOR
Filed Jan. 10, 1938  2 Sheets-Sheet 2

Inventor
Kurt Hoffmann
by B. Singer
Atty.

Patented Apr. 4, 1939

2,153,328

UNITED STATES PATENT OFFICE 2,153,328

MOTION PICTURE PROJECTOR

Kurt Hoffmann, Dresden, Germany, assignor to Zeiss Ikon Aktiengesellschaft, Dresden, Germany Application January 10, 1938, Serial No. 184,276
In Germany January 13, 1937

7 Claims. (Cl. 88—18)

The invention relates to improvements in motion picture projectors, and particularly is directed to means for adjusting the motion picture film relatively to the picture window for bringing the picture frames on the film in correct alinement with said window.

It is well known that after having threaded the film into the projector and even during the operation of the projector, it is frequently necessary to adjust the film relatively to the picture window, because the picture frames on the film move out of registration with the picture window of the projector, owing to inaccuracies in the marginal apertures, film shrinkage, splicing irregularities and other reasons.

There have been proposed already various means for adjusting the film and framing it correctly in the picture window whenever such an undesirable displacement of the picture occurs. One particular type of such framing devices is called "central picture adjusting means". In a framing device of this particular type the drive wheel of the customary Geneva gearing—which drive wheel is provided with one tooth for advancing the Geneva wheel intermittently—is pivotally adjusted about the axis of the Geneva wheel, and thereby the film advancing roller is additionally rotated. During this additional rotation the shutter of the projector is also additionally rotated and the synchronism between the drive wheel and the shutter is disturbed. It is therefore necessary, that in framing devices of this type, in which the position of the drive wheel of the Geneva gearing is changed relatively to the Geneva wheel, an additional adjusting device be provided which acts directly upon the shutter, and reestablishes the synchronism between the shutter and the wheel of the Geneva gearing.

It is now an object of the present invention to provide a picture framing device in which upon a pivotally adjustment of the drive wheel of the Geneva gearing about the axis of the Geneva wheel, the drive wheel does not change its relative position with respect to the Geneva wheel. In such a device it is then not necessary to provide a special adjusting means for the shutter.

Another object of the invention is to provide a picture framing device of simple and compact construction which may be positioned within the customary gear drive housing of the projector. In accordance with this object of the invention, the principal elements of the framing device are mounted concentrically about the axis of the Geneva wheel and any planetary gears as employed in the devices of the prior art are dispensed with.

Figure 1:
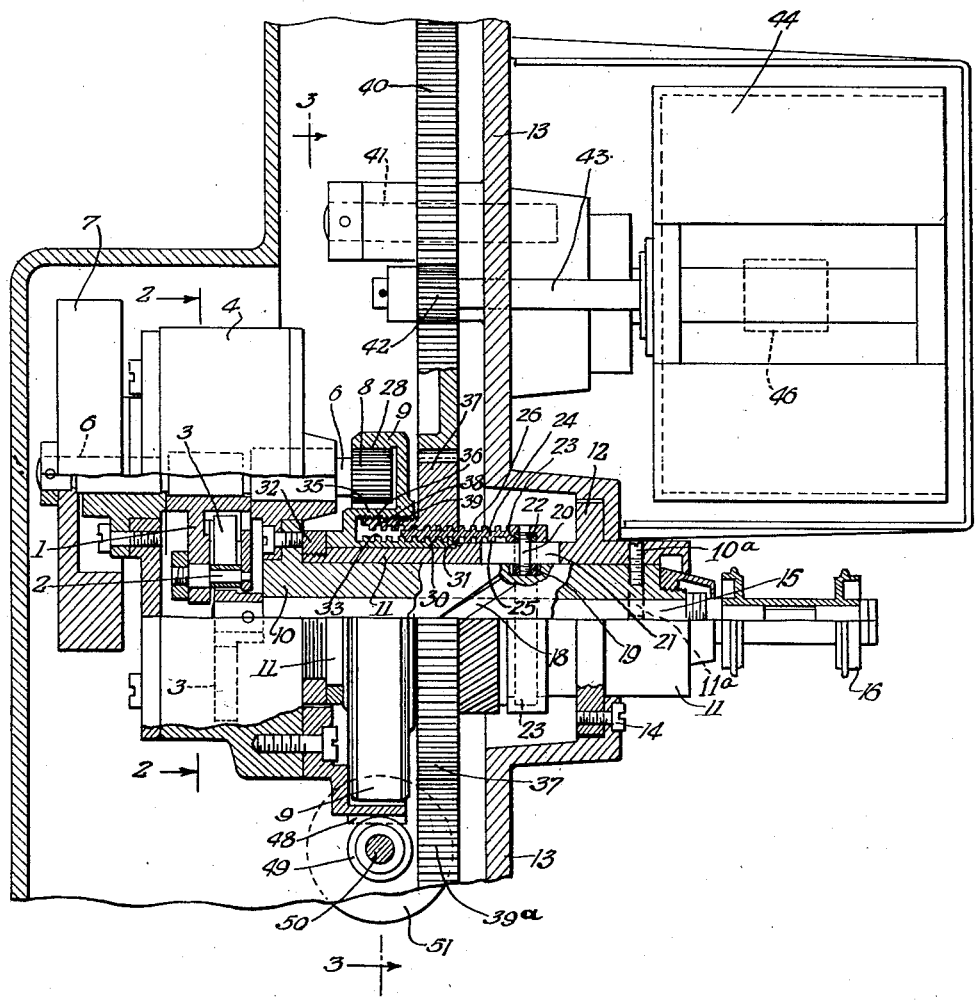
Fig. 1 is a longitudinal sectional view of the framing device substantially along the line I—I of Fig. 3.
Figure 3:
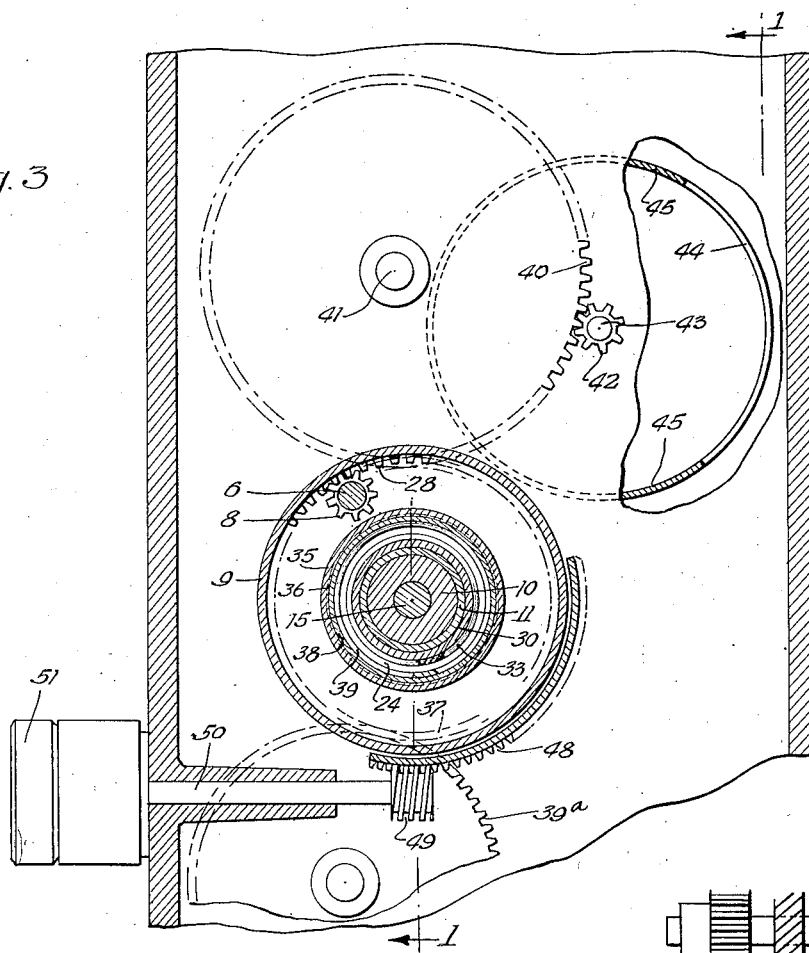
Fig. 3 is a cross-sectional view along the line III—III of Fig 1
Figure 2:
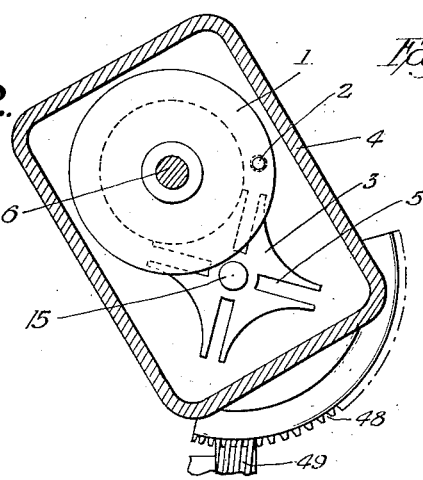
Fig. 2 is a cross-sectional view of the Geneva gearing along the line II—II of Fig. 1.

The Geneva gearing comprising a drive wheel 1 and a Geneva wheel 3 is mounted in a casing 4 filled with oil. The drive wheel 1 has a single tooth 2 for engaging the radial slots 5 of the Geneva wheel 3 to rotate the latter intermittently in well known manner. The shaft 6 on which the drive wheel 1 is attached extends with both ends outwardly of the casing 4. One end of the shaft 6 has a fly wheel 7 attached thereto and the other end carries a gear 8 engaging a driven gear 9 in a manner hereinafter described.

The casing 4 is provided with a tubular extension 10 extending parallel to the shaft 6. The tubular extension 10 is rotatably supported in a bearing sleeve 11 which is fixedly attached at its outer end by means of a flange 12 to a wall 13 of the gear housing of the projector as indicated at 14. A pin 10ª on the tubular extension projects into a circumferentially extending slot 11ª in the bearing sleeve 11 and prevents an axial displacement of the extension 10. A shaft 15 is rotatably mounted in the bore of the tubular extension 10. One end of the shaft 15 projects into the housing 4 and has the Geneva wheel 3 secured thereto. The other end of the shaft 15 projects from the outer end of the tubular extension 10 and has a film sprocket 16 attached thereto which is intermittently rotated by said Geneva wheel 3.

The outer circumference of the tubular extension 10 is provided with a helical groove 18 for a slide block 19 which has attached thereto a pin 20 extending radially outwardly through an axial slot 21 arranged in the stationary bearing sleeve 11. The outer end of the pin 20 is connected with another slide block 22 which is mounted in an annular groove 23 cut into the inner wall of a threaded sleeve 24 which surrounds the outer circumference of the bearing sleeve 11. The sleeve 24 is provided with an interior thread 25 and an oppositely directed exterior thread 26.

The gear 9 in the present embodiment of the invention is provided with internal gear teeth 28 engaging the gear 8 on the shaft 6. The gear 9 by means of a cylindrical hub portion 30 is rotatably mounted on the stationary bearing sleeve 11 and is secured against axial displacement by a shoulder 31 on said sleeve 11 and a collar 32. The outer circumference of the hub 30 is provided with a thread 33 engaging the interior thread 25 of the sleeve 24. The gear 9 is also provided with an overhanging portion 35 providing a deep annular recess surrounding the threaded hub 30. The outer wall of this annular recess is provided with an interior thread 36 which rotatably engages an exterior thread on the hub 38 of a spur gear 37. The bore of this spur gear 37 is provided with an interior thread 39 engaging the exterior thread 26 of the sleeve 24.

The spur gear 37 is driven by a gear 39ᵃ which in turn is driven by the drving mechanism (not shown) of the projector, for instance an electric motor. The spur gear 37 by means of its threaded connections with the gear 9 and sleeve 24 respectively drives these members and also engages with its teeth a gear 40 on a stub shaft 41. The gear 40 in turn engages a gear 42 on a shaft 43 which operates the shutter 44 of the projector.

The shutter 44 may be of any desired or conventional type and in the present instance a rotary drum shutter having two shutter blades 45 for alternately covering the picture window indicated at 46 is employed.

A worm gear segment 48 is attached to the casing 4 of the Geneva gearing with the center of its curvature coinciding with the axis of the shaft 15 on which the Geneva wheel 3 is mounted. A worm 49 engaging said worm segment 48 is mounted on a shaft 50 extending outwardly of the gear housing of the projector and has attached to its outer end a knob 51 for manually rotating said worm 49.

The operation of the picture adjusting device of the present invention is as follows:

If, after threading the film into the projector, or during the operation of the projector the picture is not correctly framed, the operator has to rotate the knob 51 to bring about an adjustment of the picture in the picture window. The rotation of the knob 51 and the worm 49 connected therewith results in a rotative adjustment of the casing 4 about the axis of the Geneva wheel 3. During this rotative adjustment of the casing 4 the drive wheel 1 mounted in the same is moved with its axis of rotation in an arcute path about the axis of the Geneva wheel 3. The tubular extension 10 which is fixedly connected to the casing 4 is likewise rotated. The helical groove 18 of the tubular extension 10 will be moved relatively to the slide block 19 and the pin 20 attached thereto. Since the bearing sleeve 11 is stationary the pin 20 will be forced to move axially along the slot 21 and due to its connection with the slide block 22 in the annular groove 23 the pin 20 will transmit to the threaded sleeve 24 an axial movement. The threads 25 and 26 on the sleeve 24 have a suitable pitch which upon the application of a force tending to move the sleeve in axial direction causes the threads 25 and 26 to screw into the two gears 9 and 37 respectively. Since now the threads 25 and 26 are oppositely threaded and the two gears 9 and 37 are rotatably connected with each other by the thread 36, which has a very low pitch compared with the pitch of the threads 25 and 26, the gear 37, however, due to its engagement with the gear 39ᵃ remains relatively speaking stationary, only the gear 9 will be rotatively adjusted. Since now the gear 9 during the rotative adjustment of the drive wheel 1 about the axis of the Geneva wheel 3 is rotated the same distance, owing to its engagement with the gear 8 on the shaft 6 which carries the drive wheel 1, the gear 8 cannot roll along the teeth 26 of gear 9 and therefore an additional rotation of the shaft 6 around its own axis does not occur when the shaft 6 is adjusted in an arcuate path about the Geneva wheel shaft 15. Accordingly the synchronism between the drive wheel 1 and the shutter blades 45 is maintained.

During each adjustment of the knob 51, however, the casing 4 is rocked about the axis of the shaft 15 and the next engagement of the pin 2 with a slot 5 of the Geneva wheel 3 will transmit to the latter and the shaft 15 and the film sprocket 16 attached thereto a supplemental rotation which may be negative or positive with respect to the normal driving direction of the sprocket, so that the film is adjusted relatively to the picture window 46. In this manner the knob 51 may be manipulated until the picture is correctly framed.

Figure 4:
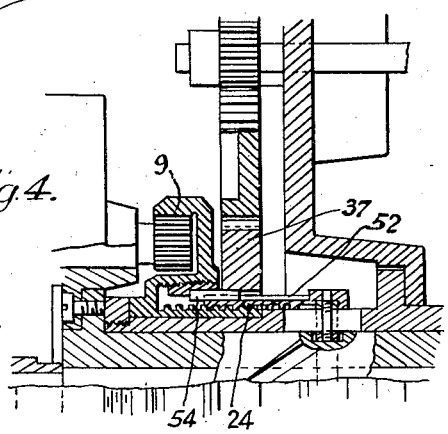
Fig. 4 illustrates a modification.

The arrangement of the two oppositely directed threads 25 and 26 on the sleeve 24 has the advantage that the axial displacement of the sleeve and accordingly the length of the sleeve is reduced to one half. It is, however, also possible to provide the sleeve only with a single thread and to use another type of guide for insuring an axial displacement of the sleeve. In such a case, the axial displacement would have to be twice as long in order to obtain the same result obtained with two oppositely directed threads. In Fig. 4 which illustrates such a modification the sleeve 24 is only provided with its interior thread 25, while its outer circumference is provided with an axially extending groove 52 for slidably receiving a key 54 attached to the inner wall of the bore of the spur gear 37.

What I claim is:

1. In a motion picture projector having a picture window, the combination with a rotary shutter and a film sprocket secured at one end of a shaft at the other end of which is secured a Geneva wheel driven intermittently by a continuously rotating drive wheel, of a picture framing means comprising a manually adjustable member for adjusting the axis of said drive wheel about the axis of said Geneva wheel and thus transmitting an additional rotative movement to said film sprocket for moving the film relatively to the picture window, means for driving said drive wheel and said rotary shutter, said means including a gear rotatable about the axis of said shaft and arranged between said film sprocket and said Geneva wheel and meshing with a pinion, a second shaft on which said pinion and said drive wheel are secured, said means including also a transmission between said gear and said shutter, and means actuated by said manually adjustable member for rotatably adjusting said gear relatively to said transmission about the axis of said Geneva wheel the same amount the said drive wheel is adjusted by said manually adjustable member so that the relative position between said drive wheel and said shutter remains unchanged.

2. In a motion picture projector having a picture window, the combination with a rotary shutter and a film sprocket operated intermittently by a Geneva wheel driven by a continuously rotating drive wheel, of a picture framing means comprising a manually adjustable member for adjusting the axis of said drive wheel about the axis of said Geneva wheel and thus transmitting an additional rotative movement to said film sprocket for moving the film relatively to the picture window, means for driving said drive wheel and said rotary shutter, said means including a gear rotatable about the axis of said Geneva wheel and meshing with a pinion, a shaft on which said pinion and said drive wheel are secured, said means including also a driven spur gear coaxially with said gear and rotatably coupled with the same by a thread and by a transmission with said rotary shutter, and an axially adjustable sleeve operatively connected with said driven spur gear and said gear meshing with said pinion, and means for axially displacing said sleeve whenever said manually adjustable member is actuated about a distance which causes a rotative adjustment of said gear about the axis of said Geneva wheel the same amount the said drive wheel is adjusted by said manually adjustable member so that the relative position between said drive wheel and said shutter remains the same.

3. In a motion picture projector having a picture window, the combination with a rotary shutter and a film sprocket operated intermittently by a Geneva wheel driven by a continuously rotating drive wheel, of a picture framing means comprising a manually adjustable member for adjusting the axis of said drive wheel about the axis of said Geneva wheel and thus transmitting an additional rotative movement to said film sprocket for moving the film relatively to the picture window, means for driving said drive wheel and said rotary shutter, said means including a gear rotatable about the axis of said Geneva wheel and meshing with a pinion, a shaft on which said pinion and said drive wheel are secured, said means including also a driven spur gear rotatably coupled with said gear by a thread and over a transmission with said rotary shutter, and an axially displaceable threaded sleeve in threaded connection with said spur gear and also with said gear meshing with said pinion, and means for axially displacing said sleeve whenever said manually adjustable member is actuated, about a distance which causes a rotative adjustment of said gear about the axis of said Geneva wheel the same amount the said drive wheel is adjusted by said manually adjustable member so that the relative position between said drive wheel and said shutter remains the same.

4. In a motion picture projector having a picture window, the combination with a rotary shutter and a film sprocket operated intermittently by a Geneva wheel driven by a continuously rotating drive wheel, of a picture framing means comprising a manually adjustable member for adjusting the axis of said drive wheel about the axis of said Geneva wheel and thus transmitting an additional rotative movement to said film sprocket for moving the film relatively to the picture window, means for driving said drive wheel and said rotary shutter, said means including a gear rotatable about the axis of said Geneva wheel and meshing with a pinion, a shaft on which said pinion and said drive wheel are secured, said means including also a driven spur gear in axial alinement with said gear, and rotatably coupled with the same by a thread and over a transmission with said rotary shutter, and an axially displaceable sleeve provided with an interior thread and an exterior thread opposed to each other, said interior thread engaging a corresponding exterior thread on the hub of said gear, while the exterior thread of said sleeve engages a corresponding interior thread on said spur gear, and means for axially displacing said sleeve whenever said manually adjustable member is actuated about a distance which causes a rotative adjustment of said gear about the axis of said Geneva wheel the same amount the said drive wheel is adjusted by said manually adjustable member so that the relative position between said drive wheel and said shutter remains the same.

5. In a motion picture projector having a picture window, the combination with a rotary shutter and a film sprocket operated by a Geneva wheel driven by a continuously rotating drive wheel, of a picture framing means including a housing in which said drive wheel and said Geneva wheel are mounted, a tubular extension fixedly connected with said housing and rotatably supported in a stationary bearing sleeve, a shaft rotatably supported in said tubular extension and having said Geneva wheel and said film sprocket fixedly mounted thereon, a manually operable member for pivotally adjusting said housing about the axis of said shaft whereby the axis of said drive wheel is adjusted about the axis of said Geneva wheel for transmitting an additional rotative movement to said film sprocket and thus moving the film relatively to the picture window of the projector, means for driving said drive wheel and said rotary shutter, said means including a gear rotatable about the axis of said Geneva wheel and meshing with a pinion, a shaft on which said pinion and said drive wheel are secured, said means including also a transmission between said gear and said shutter, and means operatively connected with said tubular extension for adjusting said gear about the axis of said Geneva wheel the same amount to which said drive wheel is adjusted by said manually adjustable member for maintaining the relative position between said drive wheel and said shutter.

6. In a motion picture projector having a picture window, the combination with a rotary shutter and a film sprocket operated by a Geneva wheel driven by a continuously rotating drive wheel, of a picture framing means including a housing in which said drive wheel and said Geneva wheel are mounted, a tubular extension fixedly connected with said housing and rotatably supported in a stationary bearing sleeve, a shaft rotatably supported in said tubular extension and having said Geneva wheel and said film sprocket fixedly mounted thereon, a manually operable member for pivotally adjusting said housing about the axis of said shaft whereby the axis of said drive wheel is adjusted about the axis of said Geneva wheel for transmitting an additional rotative movement to said film sprocket and thus moving the film relatively to the picture window of the projector, means for driving said drive wheel and said rotary shutter, said means including a gear rotatably mounted on said bearing sleeve and meshing with a pinion coaxially fixed to said drive wheel, said means including also a driven spur gear rotatably coupled by means of a thread with said gear and by a transmission with said rotary shutter, an axially adjustable sleeve mounted on said bearing sleeve and in threaded connection with said spur gear and the gear meshing with said pinion, and means for axially displacing said sleeve whenever said manually adjustable member is actuated about a distance which causes a rotative adjustment of said gear about the axis of said Geneva wheel the same amount the said drive wheel is adjusted by said manually adjustable member so that the relative position between said drive wheel and said shutter is maintained.

7. In a motion picture projector as claimed in claim 6, in which the means for displacing said axially adjustable sleeve comprising a pin projecting with one end into an interior annular groove of said sleeve and with its other end into a helical groove in the outer circumference of the tubular extension of said housing, said stationary bearing sleeve being provided with a lengthwise extending slot for permitting the passage of said pin and guiding its linear movement when said housing and therewith said tubular extension is rotatably adjusted by said manually operable member.

KURT HOFFMANN.